Dec. 6, 1955  L. P. TOPAR  2,726,091
TOOL HOLDER
Filed May 22, 1953
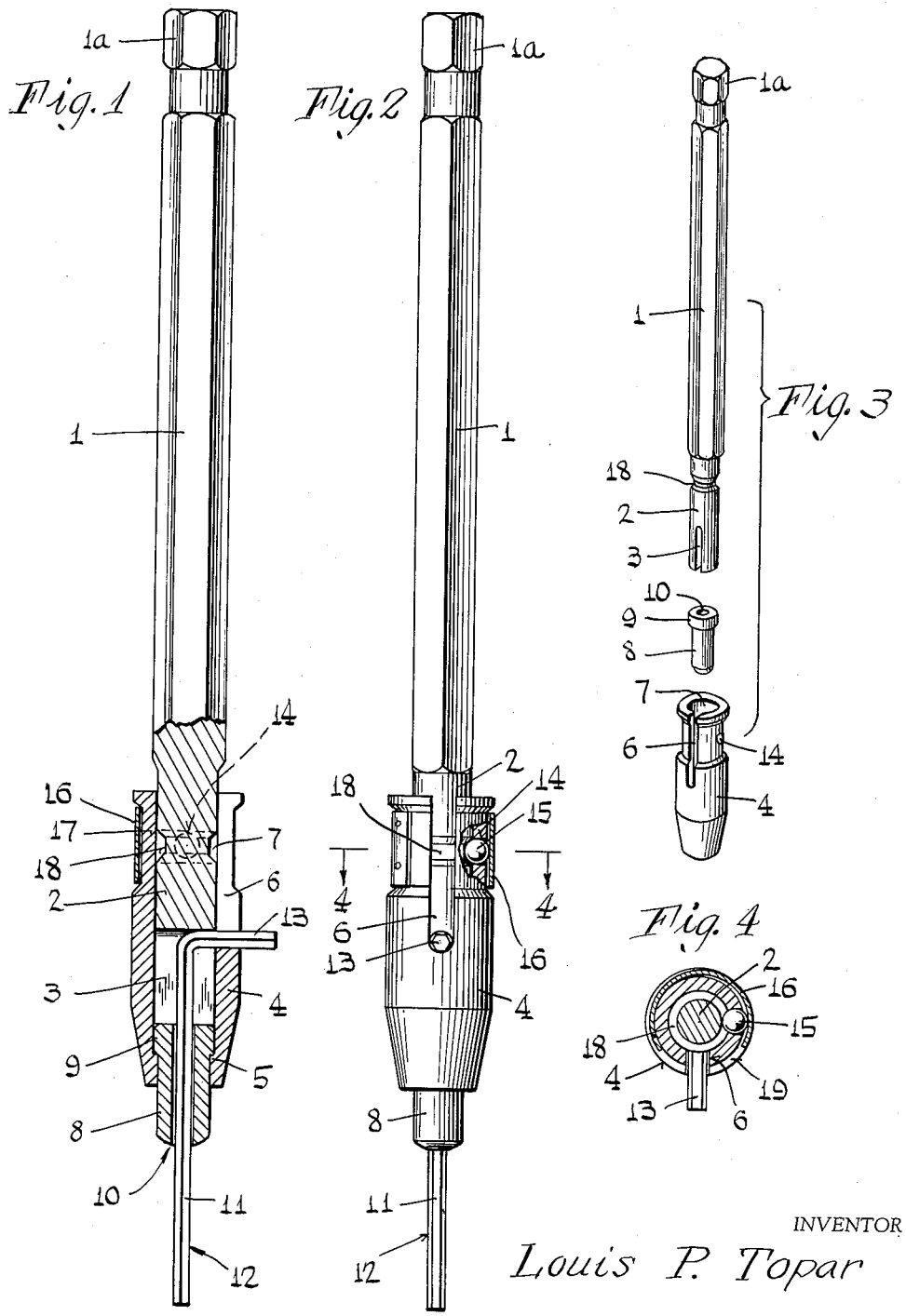
INVENTOR
Louis P. Topar
BY Johnson and Kline
ATTORNEYS

United States Patent Office 2,726,091
Patented Dec. 6, 1955

2,726,091

TOOL HOLDER

Louis P. Topar, Bridgeport, Conn.

Application May 22, 1953, Serial No. 356,738

11 Claims. (Cl. 279—93)

This invention relates to holders for tools such as Allen wrenches and the like having angular or lateral projections, and more particularly to holders of this character in which tools of various shapes and sizes may be used.

In the use of tools such as Allen wrenches, offset screw drivers and the like which have lateral or angular projections, the size and shape of the tool often result in its being extremely difficult to manipulate, especially in remote places or where added leverage is desired.

An object of the present invention is to provide an improved holder so organized and arranged that offset or lateral-handle tools of a variety of different size may be securely fastened in the holder.

A further object of the invention is to provide an improved holder for such tools, which is so designed as to be usable with air-powered and mechanical drivers, being of sufficient strength to withstand the force of such drivers without damage to the holder or the tool.

Still another object of the invention is to provide an improved tool holder as above set forth in which there is a minimum of lost motion, whereby the holder may not be moved appreciably without movement of the tool.

A further object of the invention is to provide an improved tool holder according to the foregoing, which is simple to assemble and disassemble, economical to construct, and efficient and durable in use.

Other features and advantages will hereinafter appear.

In the accompanying drawings:

Figure 1 is a view partly in elevation and partly in section, of a tool holder embodying my invention.

Fig. 2 is a front elevational view partly in section, showing the means for locking the spindle portion of the holder to the sleeve.

Fig. 3 is an exploded perspective view of the parts of my improved tool holder.

Fig. 4 is a sectional view taken on line 4—4 of Fig. 2.

Referring to the drawings which illustrate one form of my invention the tool holder comprises a spindle 1 which may be hexagonal in cross section to conveniently be engaged and operated by a wrench if desired. At least the upper end of the spindle has a noncircular portion 1a, preferably hexagonal to fit the clutching and driving head of a power-driven machine. At its lower end the spindle 1 has a shank 2 which is provided at its bottom end with a longitudinally extending diametric slot 3 for purposes hereinafter set forth.

Slidably fitting over the shank 2 is a sleeve 4 having an inwardly extending flange 5 situated near its lower end, said sleeve being also provided with a longitudinally extending slot 6 in its upper portion opening into the bore 7 of the sleeve.

In accordance with the present invention the bore 7 of the sleeve is adapted to slidably receive any one of a number of different bushings having different-diameter bores, such as the bushing 8 shown in Figs. 1, 2 and 3 having a flange 9 to engage the flange 5 at the lower end of the sleeve. By this arrangement a large number of different sizes and shapes of tools may be mounted in the holder, as will be hereinafter brought out in detail. For this purpose the bushing 8 is provided with a longitudinal bore 10 to slidably receive the shanks of tools, as for example the shank 11 of a tool 12 shown in Fig. 1.

To illustrate the invention I have exemplified the tool 12 as a wrench usually used for driving "Allen" head screws, and having a lateral arm 13 serving to conveniently turn the shank, but any type of tool having lateral or angular extensions may be used. The tool 12 is so situated that its shank 11 extends through the bore of the bushing while the laterally extending arm 13 is clamped between the upper extremity of the slot 3 in the spindle and the lower extremity of the slot 6 in the sleeve when the holder is assembled.

In the form of my invention exemplified by the drawings the upper portion of the sleeve 4 is provided with a radial hole 14 to receive a detent ball 15, the inner edge of the hole being of smaller diameter to limit inward movement of the ball. A spring steel band 16, located in an annular recess in the upper end 17 of the sleeve 4, partially encircling and frictionally engaging the sleeve urges the ball 15 into an annular groove 18 in the shank 2 and releasably holds the sleeve and the spindle in assembled position as shown in Fig. 2. A space 19 is left between the ends of the band 16, and this is located over the slot 6 so as to leave the slot clear for the passage of the lateral arm 13 of the tool.

In using my invention, to mount a tool having an angular or lateral extension in the tool holder, a bushing 8 is placed in the bore 7 of the sleeve 4 so that the flange 9 thereof engages the inwardly extending flange 5 of the sleeve. The tool 12 is then inserted in the bushing with its shank 11 extending through the bore 10 of the bushing while the laterally extending arm 13 of the tool slides down the slot 6 in the sleeve to rest at the base of said slot. Or the bushing may be first slid over the shank of the tool and then inserted with the latter into the sleeve. After this is done the shank 2 of the spindle is inserted into the sleeve 4 in such a manner that the slot 3 in the spindle is aligned with the slot 6 in the sleeve and the spindle slides to a position wherein the upper end of its slot 3 engages the top of the laterally extending arm 13 of the tool. In this position the base of the shank of the spindle rests upon the top of the flange 9 of the bushing.

The detent ball 15 in the sleeve is pressed, by the spring band 16 into the groove 18 in the shank of the spindle thereby releasably holding the spindle to the sleeve and preventing inadvertent movement therebetween. With the above construction lost motion is eliminated whereby all movements of the entire holder will result in corresponding movements of the tool 12. Simply by performing these operations in reverse the tool may be removed from the holder.

The tool holder of my invention may be used with tools of different size shanks simply by substituting other bushings of different bore diameter for that shown, each different-sized bore being for a given size of tool, said bushings having flanges 9 of different thicknesses to compensate for different thicknesses of the arms 13 whereby simultaneous engagement occurs of the shank 2 with the arm 13 and bushing 8. So long as the external dimensions of the bushing in each instance fit within the sleeve in the manner illustrated, the tool holder will function with any sized tools which can be accommodated by the bores of the bushings and sleeve. The same holding and locking effect will be obtained as set forth, without the use of any additional means.

Because of its unique and rugged construction the tool holder may be advantageously used with air powered and mechanical drivers without damage to the holder or the tool.

It will be understood that while I have illustrated the invention with an L-shaped tool it is possible to use the tool holder with bits such as screw driver bits, drill bits, and other tools which are provided with a flattened head portion to be accommodated by the slot in the shank of the spindle and the slot in the sleeve, with the shank of the bit or other tool extending through the bore in the bushing.

It will be seen from the foregoing that I have provided in a highly satisfactory manner, an easily assembled and disassembled, efficient and economical tool holder for various sizes of tools having lateral extensions.

Variations and modifications may be made within the scope of the claims and portions of the improvements may be used without others.

I claim:

1. A holder for tools of the type having a shank and a lateral extension projecting therefrom, comprising a tubular body; a bushing removably carried in said body, having a bore to slidably fit the shank of said tool, said body having a slot forming a passage for the lateral extension of the tool; and means removably held in the bore of the body, simultaneously retaining the bushing therein and clamping the tool extension against a wall of said slot.

2. A holder for tools of the type having a shank and a lateral extension projecting therefrom, comprising a tubular body; a bushing removably carried in said body, having a bore to slidably fit the shank of said tool, said body having a slot forming a passage for the lateral extension of the tool; and means removably held in the bore of the body, simultaneously retaining the bushing therein and clamping the tool extension against a wall of said slot, said means having a projecting portion extending axially from the body, serving as a handle for the tool.

3. The invention as defined in claim 1 in which the retaining means comprises a rod having a slot receiving the shank and lateral extension of the tool, the end of the rod engaging the said bushing.

4. The invention as defined in claim 3 in which the end wall of the slot in the rod engages and clamps the tool extension against the wall of the slot of the body.

5. The invention as defined in claim 1 in which there are yieldable detent means removably holding the retaining means in the body.

6. The invention as defined in claim 5 in which the detent means comprises a leaf spring mounted on the body and a ball check urged by the leaf spring against the retaining means.

7. The invention as defined in claim 6 in which the retaining means comprises a rod having an annular groove engaged by the ball check.

8. A tool holder comprising a spindle having a lower portion provided with a transverse slot to removably receive and hold a shank and a lateral extension therefrom of a tool; a sleeve slidably fitting over the lower portion of the spindle and detachably connected thereto, said sleeve having a slot opening at the top of the sleeve and forming a passage for said lateral extension of the tool when the sleeve is slid over said spindle, the bore of the sleeve being substantially larger than the shank of the tool; a bushing having a bore slidably fitting the shank of the tool, fitted in the bore of the sleeve to hold the shank of the tool rigidly concentric with the sleeve and the spindle when the latter are connected; and means for positioning the bushing in the sleeve.

9. A tool of the class described comprising a spindle having a shank portion provided in its lower end with a longitudinally extending slot; a sleeve slidably receiving the shank of the spindle and having in its upper portion a slot registered with the slot in the shank of the spindle, said sleeve having an inwardly extending flange in its lower portion; detent means holding the sleeve to said spindle against inadvertent axial movement; a bushing in said sleeve, having a flange engaging the flange of the sleeve, said bushing engaging the shank end of the spindle; and a tool having a lateral extension and a shank, said tool shank extending through the bushing and the tool extension being clamped between the slots in the spindle and the sleeve.

10. The invention as defined in claim 9 in which the means for holding the sleeve against movement comprises a ball in a hole in the side of the sleeve, engaging the spindle shank, and a spring band disposed around and frictionally engaging said sleeve and pressing against the ball to hold the latter in engagement with the spindle shank.

11. The invention as defined in claim 9 in which the flange of the bushing engages the shank end of the spindle and is clamped thereby against the flange of the sleeve.

References Cited in the file of this patent

UNITED STATES PATENTS

| | | |
|---|---|---|
| 206,006 | Crockford | July 16, 1878 |
| 1,901,168 | Kalben | Mar. 14, 1933 |
| 2,333,405 | Appton | Nov. 2, 1943 |
| 2,346,364 | Dowe | Apr. 11, 1944 |
| 2,569,069 | Motel | Sept. 25, 1951 |